United States Patent [19]

Horner et al.

[11] Patent Number: 5,073,006

[45] Date of Patent: Dec. 17, 1991

[54] COMPACT 2F OPTICAL CORRELATOR

[75] Inventors: Joseph L. Horner, Belmont; Charles K. Makekau, Bedford, both of Mass.

[73] Assignee: The United States of America as represented by the Secretary of the Air Force, Washington, D.C.

[21] Appl. No.: 502,609

[22] Filed: Mar. 30, 1990

[51] Int. Cl.[5] .............................. G02B 27/42

[52] U.S. Cl. .............................. 359/561; 364/827; 382/42

[58] Field of Search .............................. 350/162.12, 163.13; 364/822, 827; 340/146.3; 382/31, 42

[56] References Cited

U.S. PATENT DOCUMENTS

| | | | |
|---|---|---|---|
| 3,880,497 | 9/1975 | Bryngdahl | 350/162.12 |
| 4,118,107 | 10/1978 | Parrent, Jr. et al. | 350/162.13 |
| 4,360,269 | 11/1982 | Iwamoto et al. | 350/162.12 |
| 4,695,973 | 9/1987 | Yu | 350/162.13 |
| 4,765,714 | 8/1988 | Horner et al. | 364/822 |
| 4,869,574 | 9/1989 | Hartman | 350/162.13 |

OTHER PUBLICATIONS

Flavin, Mary A. et al., "Amplitude Encoded Phase-Only Filters", Applied Optics, vol. 28, No. 9, May 1, 1989, pp. 1692–1696.

*Primary Examiner*—Bruce Y. Arnold
*Assistant Examiner*—J. P. Ryan
*Attorney, Agent, or Firm*—Jacob N. Erlich; Donald J. Singer

[57] ABSTRACT

A 2f Fourier transform optical correlator uses two simple, single element lenses, with the second lens performing both quadratic phase term removal and the inverse Fourier transform operation in a compact two-focal-length space. This correlator performs correlations quite well and uses three less lens elements than a prior 2f system, is shorter by a factor of two compared to the standard 4f system, and uses one less lens than the 3f system, while still retaining the variable scale feature.

4 Claims, 1 Drawing Sheet

COMPACT 2F OPTICAL CORRELATOR

STATEMENT OF GOVERNMENT INTEREST

The invention described herein may be manufactured and used by or for the Government for governmental purposes without the payment of any royalty thereon.

BACKGROUND OF THE INVENTION

The classical coherent optical correlator is usually configured as a system with a linear dimension of 4 f, where f is the focal length of each of the two Fourier transform (FT) lenses. This configuration is shown in FIG. 1, where $P_1$ is the input plane, $L_1$ is the first FT lens with focal length $f_1$, $P_2$ is the Fourier or filter plane, $L_2$ is the inverse FT lens with focal length $f_2$, and $P_3$ is the output or correlation plane. The focal length of the FT lenses must be selected according to the wavelength of light used and the size of the input object at $P_1$ and the filter at $P_2$. Frequently, spatial light modulators (SLMs) are used in both planes $P_1$ and $P_2$ for real time processing, using phase-only filter technology. See J. L. Horner and P. D. Gianino, "Phase-Only Matched Filtering," Appl. Opt. 23, 812-816 (1984) and J. L. Horner and J. R. Leger, "Pattern Recognition with Binary Phase-Only Filter," Appl. Opt. 24 609-611 (1985). See also U.S. Pat. No. 4,765,714 to Horner. It has been shown that the focal length of lens $L_1$ must be $$f_1 = \frac{N_2 d_1 d_2}{\lambda}, \tag{1}$$

where $f_1$ is the required focal length of the first FT lens, $d_1$ and $d_2$ are the pixel size of the SLM in the input and filter planes, $N_2$ is the number of pixels in the filter SLM, and is the wavelength of light. For example, for the "Semetex" (TM) 128×128 Magneto-Optic SLM, $N_2=128$, $d_1=d_2=76$ m,=632.8 nm (He-Ne), and Eq. (1) gives a focal length $f_1$ of 117 cm, or a 4 f length of over 4.5 m which is too long to be practical.

Flannery et al. proposed a system using two-element telephoto lenses for $L_1$ and $L_2$ that reduced the basic correlator length to 2 f. See D. L. Flannery et al., "Real-Time Coherent Correlator Using Binary Magnetooptic Spatial Light Modulators at Input and Fourier Planes," Appl. Opt. 25, 466 (1986). The system had another desirable feature in that it allowed the scale of the Fourier transform to be continuously varied, thus allowing for an exact size match between the input and filter SLM and compensating for any errors in measuring the focal length of the actual lenses used. VanderLugt also considered the information storage capacity of a 2 f holographic system. See A. VanderLugt, "Packing Density in Holographic Systems," Appl. Opt. 14, 1081-1087 (1975).

SUMMARY OF PREFERRED EMBODIMENTS OF THE INVENTION

The 2 f optical correlator of the present invention, uses two simple, single element lenses in a configuration similar to the 3 f system to be described, but with the second lens performing both quadratic phase removal and the inverse Fourier transform operation in a more compact two-focal-length space. This correlator retains the aforesaid highly desirable scale feature and produces good correlation results.

BRIEF DESCRIPTION OF THE DRAWINGS

Other objects, features, and advantages of the invention will become apparent upon study of the following description taken in conjunction with the drawings in which.

DETAILED DESCRIPTION OF THE INVENTION

Figure 1:
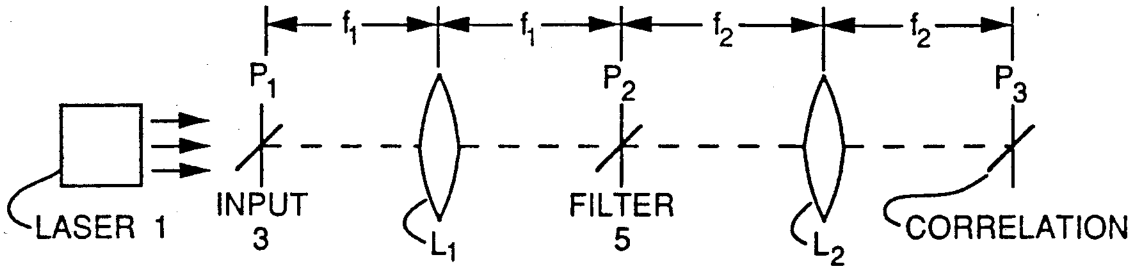
FIG. 1 PRIOR ART
FIG. 1 illustrates a prior art 4 f correlator.
Figure 2:
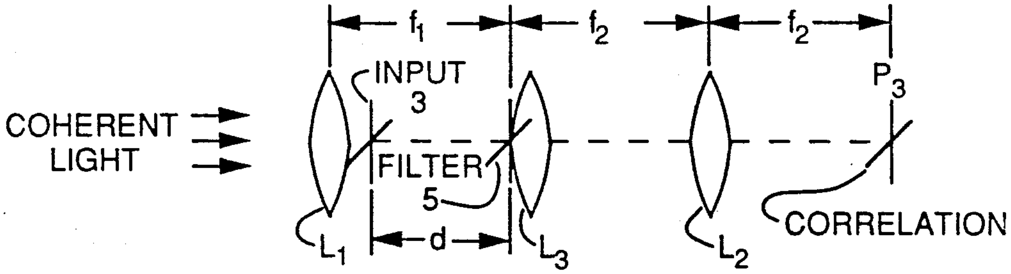
FIG. 2 illustrates a 3 f correlator.

The 4 f prior art optical correlator of FIG. 1, uses the four optical focal lengths of its two FT lenses to match an input object at $P_1$ (film or SLM) against its conjugate filter in the frequency plane $P_2$ for a correlation output at $P_3$. The 3 f system uses an extra lens $L_3$ but is shorter by one optical focal length as shown in FIG. 2. By placing the input object 3 behind the first lens $L_1$, the scale of the input object Fourier transform at the filter plane 5 is proportional to d as $$A(x_2, y_2) = \exp\left[\cdot\frac{jk}{2d}[x_2^2 + y_2^2)\right]F(f_{x2}, f_{y2}), \tag{2}$$

where we omitted unimportant constants. In Eq. (2), $A(x_2,y_2)$ is the FT amplitude distribution of the input object in the filter plane $P_2$,k is the wavenumber and equals $$2\pi/\lambda,$$

d is the distance between input object and filter plane, $F(f_{x2},f_{y2})$ is the Fourier transformation of the input object, and $f_{x2}$,$y_2$ are the spatial frequencies and equal to $(x_2,y_2)_\lambda f$. The first factor in Eq. (2), exp $$[jK/2d(x_2^2 + y_2^2)].$$

is a wavefront distorting quadratic phase term due to this configuration. Lens $L_3$ is the phase compensation lens used to remove this distorting positive quadratic phase term present at the filter plane. It is placed close to and behind the filter and should have a focal length $f_3$ equal to d because it introduces a negative phase factor, exp $$[-jK/2f_3(x_2^2 + y_2^2)],$$

at that plane. Lens $L_2$ functions, as in the 4 f system, by inverse Fourier transforming the disturbance behind the filter plane, which equals the product of the input object Fourier transform, filter function, and phase distortion contribution into a correlation signal in correlation plane $P_3$.

Figure 3:
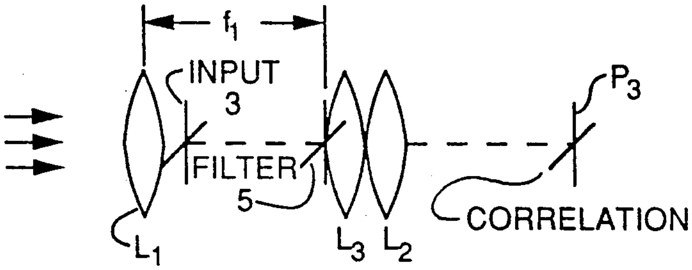
FIG. 3 conceptually illustrates combining 2 lenses into one lens.
Figure 4:
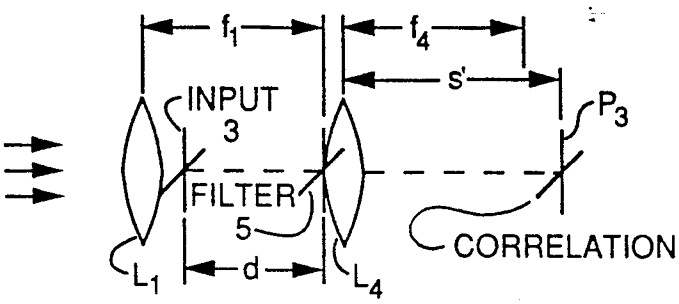
FIG. 4 illustrates a two lens 2 f correlator.

To proceed to a 2 f system, we know that in the correlation plane we physically observe light intensity and not amplitude. Therefore, any arbitrary phase factor appearing with the correlation signal is not observable. Referring to FIG. 3, if we move lens $L_2$ to the left until it is against lens $L_3$, we introduce a phase factor, exp $$[jK/2f_2(x_3^2 + y_3^2)],$$

at the correlation plane. We can then combine lenses $L_2$ and $L_3$ in FIG. 3 into one lens $L_4$ as shown in FIG. 4, to make the 2 f system. We assume two thin lenses in contact to use the relationship $1/f_4 = 1/f_2 + 1/f_3$, where $f_{2,3}$ are the focal lengths of the lenses used in the 3 f system and $f_4$ is the equivalent focal length required. We then locate the correlation plane $P_3$ position for the 2 f system by using the Gaussian lens formula, $1/f_4 = 1/s + 1/s'$, where s and s' are the input object and image distances from lens $L_4$, respectively, and s is equal to d. Here we solve for s' because with this configuration and no filter, we have an imaging system with its associated output image plane at $P_3$. We can verify this position by adjusting the output image detector in $P_3$ until the input image is in focus. We did this in the laboratory and experimental results agree with the above theory.

Experimental autocorrelation results for the 2 f configuration of FIG. 4 were very good compared with the 3 f and 4 f configurations, using a binary phase-only filter etched on a quartz substrate. See M. Flavin and J. Horner, "Correlation Experiments with a Binary Phase-Only Filter on a Quartz Substrate," Opt. Eng 28, 470–473 (1989). The correlation plane peak intensity was digitized using a CCD camera and a frame grabber board and stored as a 512×512-byte, 256-level gray scale image array. After uploading this image into a VAX 8650 equipped with IDL software, we obtained SNR information and an intensity surface plot. IDL, Interactive Data Language, software is marketed by Research Systems, Inc. 2001 Albion St., Denver, Colo. 90207. We define SNR (signal to noise ratio):

$$SNR = \frac{I_{max}}{RMS(I < 0.5\, I_{max})} \quad (3)$$

where I is the intensity distribution at the correlation plane. The SNR for the experimental setup intensity data measured 15.4, while a computer simulation yielded a SNR of 228.4. The difference between theoretical and experimental SNR values is primarily due to sources of error, such as input object film nonlinearity and the absence of a liquid gate around the input object transparency. Although the SNR numbers differ substantially, a simple peak detector has no problem detecting the experimental correlation peak.

While preferred embodiments of the present invention have been described, numerous variations will be apparent to the skilled worker in the art, and thus the scope of the invention is to be restricted only by the terms of the following claims and art recognized equivalents thereof.

What is claimed is:

1. An optical correlator system comprising:

(a) a first Fourier transform single lens for taking the Fourier transform of a first signal representing an input image and forming said Fourier transform at a first position along an optical axis;

(b) a filter located at said first position providing information obtained from a second signal which is to be correlated with said first signal;

(c) a second Fourier transform single lens in optical alignment with said filter for taking the inverse Fourier transform of the product of the Fourier transform of said first signal and said information of said second signal, and for forming said inverse Fourier transform at a second position along said optical axis, said inverse Fourier transform being substantially equivalent to the mathematical correlation function between said first signal and said second signal;

(d) input signal producing means positioned close to said first lens and between said first lens and said second lens for producing said first input signal behind said first Fourier transform lens to introduce a wavefront distortion quadratic phase term; and (e) means for positioning said second Fourier transform single lens close to said filter and between said filter and said second position, said second Fourier transform single lens having a focal length which removes said quadratic phase term from said wavefront while concurrently inverse Fourier transforming the disturbance behind the filter to produce a correlation signal at said second position.

2. The system of claim 1 wherein said second Fourier transform single lens is equivalent to a second and third thin lens in contact with one another and wherein the combined focal length of said second and third thin lenses is equal to the distance between said filter and said input signal producing means.

3. The correlation system of claim 2 wherein said filter is a binary phase only filter.

4. The correlation system of claim 1 wherein said filter is a binary phase only filter.

* * * * *